United States Patent
Irie et al.

(10) Patent No.: US 10,219,533 B2
(45) Date of Patent: Mar. 5, 2019

(54) FROZEN NOODLES AND PRODUCTION METHOD THEREFOR

(71) Applicant: NISSHIN FOODS INC., Chiyoda-ku (JP)

(72) Inventors: Kentarou Irie, Fujimino (JP); Youhei Suga, Fujimino (JP); Norio Koizumi, Fujimino (JP); Takenori Watanabe, Fujimino (JP); Youichirou Miya, Fujimino (JP); Tsuguhiko Yoshida, Chiyoda-ku (JP)

(73) Assignee: NISSHIN FOODS INC., Chiyoda-ku (JP)

( * ) Notice: Subject to any disclaimer, the term of this patent is extended or adjusted under 35 U.S.C. 154(b) by 916 days.

(21) Appl. No.: 14/389,943

(22) PCT Filed: Apr. 5, 2013

(86) PCT No.: PCT/JP2013/060498
§ 371 (c)(1),
(2) Date: Oct. 1, 2014

(87) PCT Pub. No.: WO2013/172117
PCT Pub. Date: Nov. 21, 2013

(65) Prior Publication Data
US 2015/0110942 A1    Apr. 23, 2015

(30) Foreign Application Priority Data

May 15, 2012   (JP) .................................. 2012-111539
Jul. 19, 2012   (CN) .......................... 2012 1 0250795

(51) Int. Cl.
*A23L 7/109* (2016.01)
*A23L 29/269* (2016.01)

(52) U.S. Cl.
CPC ............... *A23L 7/111* (2016.08); *A23L 29/27* (2016.08); *A23L 7/109* (2016.08); *A23L 29/269* (2016.08); *A23V 2002/00* (2013.01)

(58) Field of Classification Search
CPC ...... A23V 2002/00; A23L 29/27; A23L 7/111; A23L 29/269; A23L 7/109
USPC ................................................ 426/557, 302
See application file for complete search history.

(56) References Cited

U.S. PATENT DOCUMENTS

| | | |
|---|---|---|
| 2004/0058037 A1 | 3/2004 | Masuda et al. |
| 2004/0253349 A1 | 12/2004 | Kato et al. |
| 2010/0189846 A1 | 7/2010 | Irie |

FOREIGN PATENT DOCUMENTS

| | | |
|---|---|---|
| CN | 101513201 A | 8/2009 |
| CN | 101848651 A | 9/2010 |
| EP | 2 201 847 A1 | 6/2010 |
| EP | 2 850 951 A1 | 3/2015 |
| JP | 62 19059 | 1/1987 |
| JP | 7 99907 | 4/1995 |
| JP | 8 89193 | 4/1996 |
| JP | 10-337161 A | 12/1998 |
| JP | 11-151071 A | 6/1999 |
| JP | 2001 95514 | 4/2001 |
| JP | 2001128632 A * | 5/2001 |
| JP | 2002-354998 A | 12/2002 |
| JP | 2003 135013 | 5/2003 |
| JP | 2007 174920 | 7/2007 |
| JP | 2010 246466 | 11/2010 |
| RU | 2 274 244 C2 | 4/2006 |
| WO | 03 022079 | 3/2003 |
| WO | 2009 054100 | 4/2009 |

OTHER PUBLICATIONS

Combined Chinese Office Action and Search Report dated Sep. 25, 2015 in Patent Application No. 201380025262.7 (with English Translation of Category of Documents).
Wang Yuan-Ian et al., "Rheology Study on Low Concentration Cold Water and Hot Water Dissolving Parts of Xanthan gum", Food Science, vol. 28, No. 6, 2007, 5 pages (with English Abstract and Partial English Translation).
Extended European Search Report dated Jun. 22, 2015 in Patent Application No. 13790765.5.
Monta Oda, et al., "Machine-Made Noodles", New Book of Noodles, Total 16 Pages, (1994) (with Partial translation).
International Search Report and Written Opinion of the International Searching Authority dated Jul. 9, 2013 in PCT/JP13/060498 Filed Apr. 5, 2013.
Combined Office Action and Search Report dated Nov. 4, 2015 in Chinese Patent Application No. 201380025312.1 with English translation of category of documents.
U.S. Appl. No. 14/391,965, filed Oct. 10, 2014, Irie, et al.
Office Action dated Dec. 17, 2013 in Japanese Patent Application No. 2013-549079 (with English language translation).
Russian Office Action dated Jan. 13, 2017 in Patent Application No. 2014150567 (with English Translation).

* cited by examiner

*Primary Examiner* — Jyoti Chawla
(74) *Attorney, Agent, or Firm* — Oblon, McClelland, Maier & Neustadt, L.L.P.

(57) ABSTRACT

Provided is a method for producing frozen noodles comprising: a step of attaching a composition comprising xanthan gum and having a viscosity of from 30 to 2000 mPa·s at 60° C. to cooked noodles obtained by cooking fresh noodles produced by a rolling noodle-manufacturing method; and a step of freezing the noodles to which the composition has attached.

18 Claims, No Drawings

FROZEN NOODLES AND PRODUCTION METHOD THEREFOR

CROSS-REFERENCE TO RELATED APPLICATIONS

This application is a National Stage of PCT/JP2013/060498, which was filed on Apr. 5, 2013. This application is based upon and claims the benefit of priority to Japanese Application No. 2012-111539, which was filed on May 15, 2012, and to Chinese Application No. 201210250795.2, which was filed on Jul. 19, 2012.

TECHNICAL FIELD

The present invention relates to a method for producing frozen noodles. More particularly, it relates to a method for producing frozen cooked noodles which are produced by cooking and freezing fresh noodles produced by a rolling noodle-manufacturing method, can be stored in a frozen state for a long period of time, and have, after being thawed, a good appearance and a resilient (koshi) texture as those attained by boiling extruded fresh noodles.

BACKGROUND ART

Fresh noodles are noodles produced without a drying process. The fresh noodles have a large water content, and hence have a soft but elastic favorable texture peculiar to them and different from that of dry noodles. The fresh noodles are generally produced by, for example, a hand-made method, the rolling noodle-manufacturing method or an extruding noodle-manufacturing method at a low pressure. Since there is no need to perform a drying process for fresh noodles, and in order to give a soft texture peculiar to noodles, the fresh noodles are generally produced without applying a high pressure to noodle dough.

If fresh noodles are produced by the extruding noodle-manufacturing method, it is necessary to apply some pressure to dough in extrusion of the noodles. As a result, the fresh noodles produced by the extruding noodle-manufacturing method attain a smooth surface and a more resilient (koshi) texture. The extruding noodle-manufacturing method is, however, complicated in procedures.

On the other hand, the rolling noodle-manufacturing method is a favorable method because procedures are simpler, while it is applicable to industrial production. Fresh noodles produced by the rolling noodle-manufacturing method have, however, a large water content, and hence have a problem of low preservability. Besides, if the fresh noodles produced by the rolling noodle-manufacturing method are refrigerated or frozen stored, they are easily deteriorated during the storage, and it is difficult to maintain their appearance and texture good. Furthermore, if the fresh noodles produced by the rolling noodle-manufacturing method are refrigerated or frozen stored together with a sauce, the sauce permeates into the noodles during the storage, and hence the noodles become too soft and the quality is degraded.

As a method for preventing quality degradation of frozen noodles during frozen storage, Patent Literature 1 proposes a method for preventing freezer burn of frozen noodles by attaching a coating liquid containing at least water, common salt, oil or fat and a thickener to cooked noodles and freezing the noodles.

Patent Literature 2 describes a method for producing frozen noodles in which boiled noodles are coated with an emulsified oil obtained by mixing and emulsifying water, oil or fat, a protein and/or a hydrolysate thereof, and a polysaccharide thickener; the noodles are formed and frozen so that the frozen noodle mass may have a recessed part at the center thereof; water or an aqueous liquid is attached to the surface of the noodles during or after the freezing; and the resulting noodles are further frozen so as to form a frozen layer of the water or the aqueous liquid on the surface of the noodles.

Patent Literature 3 discloses that a high-oil emulsified oil or fat composition obtained by mixing an emulsifier, a polyhydric alcohol, water and oil or fat under a specific condition is attached to cooked noodles, followed by freezing.

Besides, as a method for preventing quality degradation of a frozen fried food during frozen storage, Patent Literature 4 proposes a method in which a thickener having properties of hardly dissolving in cold water and easily dissolving in hot water is contained in a coating mix. Patent Literature 5 describes a method for producing a frozen food in which a food is frozen after bringing an oil or fat containing an emulsifier into contact with the food.

The above-described conventional methods are, however, methods for preventing drying of noodles during freezing and the resulting quality degradation.

CITATION LIST

Patent Literature

[Patent Literature 1]
   International Publication No. WO2009/054100
[Patent Literature 2]
   JP-A-2007-174920
[Patent Literature 3]
   JP-A-2010-246466
[Patent Literature 4]
   JP-A-2003-135013
[Patent Literature 5]
   International Publication No. WO2003/022079

SUMMARY OF INVENTION

Technical Problem

An object of the present invention is to provide frozen cooked noodles which are produced by cooking and freezing fresh noodles produced by the rolling noodle-manufacturing method, can be stored in a frozen state for a long period of time, and have, after being thawed, a good appearance and a texture as those of fresh noodles obtained by the extruding noodle-manufacturing method.

Solution to Problem

The present inventors made various studies to achieve the above-described object, and as a result, found that frozen noodles, which can be frozen stored for a long period of time, and when thawed, have a good appearance and a good resilient (koshi) and elastic texture as those attained by boiling fresh noodles obtained by the extruding noodle-manufacturing method, can be obtained by attaching a composition comprising xanthan gum and having a specific viscosity to cooked noodles obtained by cooking fresh noodles produced by the rolling noodle-manufacturing method and subsequently freezing the noodles to which the composition has attached, and thus accomplished the present invention.

Specifically, the present invention provides the following:

A method for producing frozen noodles comprising:
a step of attaching a composition comprising xanthan gum and having a viscosity of from 30 to 2000 mPa·s at 60° C. to adhere to cooked noodles obtained by cooking fresh noodles produced by a rolling noodle-manufacturing method; and
a step of freezing the noodles to which the composition has attached.

Besides, the present invention provides the following:

A method for improving an appearance or a texture of frozen cooked noodles obtained by cooking and freezing fresh noodles produced by a rolling noodle-manufacturing method comprising:
a step of attaching a composition comprising xanthan gum and having a viscosity of from 30 to 2000 mPa·s at 60° C. to cooked noodles obtained by cooking fresh noodles produced by the rolling noodle-manufacturing method; and
a step of freezing the noodles to which the composition has attached.

Advantageous Effect of Invention

Although frozen noodles obtained by the production method of the present invention are noodles obtained by cooking and freezing fresh noodles produced by the rolling noodle-manufacturing method, the appearance can be maintained good even after long-term frozen storage, and after the noodles are thawed, they have a good appearance and a resilient (Koshi) texture as those obtained in eating extruded fresh noodles immediately after boiling. Besides, the frozen cooked noodles obtained by the production method of the present invention have the aforementioned good appearance and texture even if they are frozen stored with a sauce added thereto.

DESCRIPTION OF EMBODIMENT

The fresh noodles used in the method for producing frozen noodles of the present invention are not especially limited as long as they are noodles produced without performing a drying process, and examples include pasta such as macaroni and spaghetti, Japanese thick noodles (udon), medium-thick noodles (hiyamugi), thin noodles (somen), flat-faced noodles (hiramen), Japanese buckwheat noodles (soba), Chinese noodles, rice noodles and dough wrappers (such as Chinese dumpling wrappers (gyoza), laviolis a la vapeur (shumai), spring roll (harumaki), Chinese wonton wrappers and pizza dough).

The fresh noodles may be produced by the rolling noodle-manufacturing method generally employed in the art, namely, a method for producing fresh noodles in which noodle dough is rolled by using a roller without applying a high pressure (at a pressure of, for example, 0 kgf/cm$^2$ or more and less than 20 kgf/cm$^2$). The fresh noodles produced by the rolling noodle-manufacturing method have a larger water content and are soft in general, and therefore, the constitutional structure of the noodles is easily broken by freezing. Accordingly, the raw noodles produced by the rolling noodle-manufacturing method are generally liable to lose the resilience during freezing, and liable to become too soft or lose the shape because of absorption of a sauce. The frozen noodles obtained by the production method of the present invention, however, can be frozen stored for a long period of time with their quality maintained, and have, after being thawed, a good appearance and a resilient (koshi) and elastic texture as those of fresh noodles obtained by the extruding noodle-manufacturing method although they are cooked noodles obtained from the fresh noodles produced by the rolling noodle-manufacturing method.

The fresh noodles used in the present invention can be produced by a usual method from noodle dough obtained by kneading flour such as wheat flour and kneading water by a general method. For example, an appropriate amount of wheat flour and saline are put in a mixer for noodles to be thoroughly kneaded to produce noodle dough. The noodle dough is prepared into noodle sheets by using a mill roll, then the noodle sheets are cut out by using a cutting blade (for example, #12 round), and thus, noodle strands can be produced.

The fresh noodles are cooked to be gelatinized before freezing. The cooking means is not especially limited as long as the noodles can be gelatinized, and examples include heat cooking such as boiling, steaming, frying, baking and microwave heating with a microwave oven or the like. Preferably, the fresh noodles are cooked by heating together with water so that the yield of the cooked noodles may be about from 200 to 250%.

Subsequently, to the cooked noodles obtained by cooking the fresh noodles, a composition containing xanthan gum is attached. The viscosity of the composition may be from 30 to 2000 mPa·s at 60° C., preferably from 100 to 1000 mPa·s at 60° C. If the viscosity of the composition is lower than 30 mPa·s at 60° C., the effect to improve the appearance or the texture of the noodles cannot be attained, and on the other hand, if the viscosity exceeds 2000 mPa·s, the mouthfeel of the noodles becomes sticky, which degrades the texture.

Herein, the viscosity of the composition may be a value measured by using a rotational viscometer (a single cylindrical rotational viscometer, such as one manufactured by Tech-Jam Co., Ltd.).

The composition having the above-described viscosity can be prepared by adjusting the viscosity of the xanthan gum contained in the composition by adding water or the like, or by adding another component, a polysaccharide, a thickener or the like affecting the viscosity of the xanthan gum.

The content of the xanthan gum in the composition may be from 0.1 to 1.0% by mass, preferably from 0.3 to 0.7% by mass. If the content is lower than 0.1% by mass, the effect to improve the appearance or the texture of the noodles cannot be attained, and on the other hand, if the content exceeds 1.0% by mass, the viscosity of the composition is so high that the mouthfeel of the noodles becomes sticky, which degrades the texture.

The composition may further contain water. If water is contained, the content of the water in the composition is preferably from 60 to 80% by mass, more preferably 65 to 75% by mass. If the content of the water is lower than 60% by mass, the noodles become sticky after being thawed, and hence the quality is degraded, and on the other hand, if the content of the water exceeds 80% by mass, the composition becomes watery, which reduces the taste and flavor of the noodles after being thawed.

The composition may further contain oil or fat. If the oil or fat is contained, a taste and flavor may be further given to the noodles. As the oil or fat that can be contained in the composition, any of vegetable and animal food oils or fats generally used for food may be used, and examples include soybean oil, margarine, shortening, butter, olive oil, cacao butter, palm oil, palm kernel oil, coconut oil, corn oil, cotton oil, rapeseed oil, sunflower oil, tallow, lard, milk fat, fish oil and the like, among which soybean oil and margarine are preferred from the viewpoint of improvement of the taste and flavor. The oils or fats may be used singly or in a mixture of two or more. If the oil or fat is contained, the content of the oil or fat in the composition is preferably from 27 to 38% by mass, more preferably form 30 to 35% by mass. If the content of the oil or fat is lower than 27% by mass, the taste and flavor as well as texture peculiar to the oil cannot be given to the noodles, and on the other hand, if the content of the oil or fat exceeds 38% by mass, the oily feeling becomes so strong that the quality of the noodles is degraded.

The composition may further contain, in addition to the xanthan gum, the water and the oil or fat, another material such as a polysaccharide other than xanthan gum, a thickener, an emulsifier or a seasoning. The polysaccharide other than the xanthan gum to be contained in the composition may be any polysaccharide generally used for food, and examples include water-soluble or poorly water-soluble polysaccharides such as tamarind gum, guar gum, curdlan, carrageenan, agar, locust bean gum, hyaluronic acid, pectin, alginic acid, cellulose and methyl cellulose. Among these, a water-soluble polysaccharide is preferred from the viewpoint of improvement of dispersibility. The polysaccharides may be used singly or in a mixture of two or more. If the polysaccharide is contained, the content of the polysaccharide in the composition is preferably from 0.1 to 1.0% by mass, more preferably from 0.3 to 0.7% by mass. Examples of the emulsifier include sucrose fatty acid esters, glycerin fatty acid esters, propylene glycol fatty acid esters, sorbitan fatty acid esters, lecithin and the like. The emulsifiers may be used singly or in a mixture of two or more. Any of seasonings generally used in seasoning noodles may be contained as long as the effect of the present invention is not inhibited. However, from the viewpoint of preventing an increase of a boiling point and a decrease of a freezing point of the frozen noodles, it is preferred that the composition does not contain common salt. If the composition contains common salt, the quality of the noodles may be degraded in freezing/thawing, or the taste and flavor may be degraded.

The composition can be prepared by, for example, appropriately mixing the xanthan gum with another material described above or the like as occasion demands. The preparation process for the composition is not especially limited as long as the xanthan gum can be preferably substantially homogeneously dispersed in the whole composition. Examples of the form of the prepared composition include an aqueous solution, a suspension, a dispersion, an emulsion, a gel and the like, and the composition may be in any of these forms as long as the aforementioned viscosity and the dispersibility of the xanthan gum can be maintained.

The composition is preferably attach to the cooked noodles in an amount of from 1 to 15% by mass, preferably from 5 to 10% by mass based on the mass of the cooked noodles. If the amount attached is smaller than 1% by mass, the composition component cannot be sufficiently spread over the noodles, and on the other hand, if the adhering amount exceeds 15% by mass, the composition may thin a sauce for the noodles in some cases.

Means for attaching the composition to the cooked noodles is not especially limited as long as the composition can be homogeneously attached to the surface of noodle strands or a noodle mass. Examples of the means for adhesion include submerging, smearing, spraying, blending and the like, and from the viewpoint of the operational efficiency, spraying is preferably employed.

The food product temperature of the cooked noodles (i.e., the surface temperature of the noodles measured with a thermometer) in attaching the composition thereto is preferably 15° C. or less. The cooked noodles obtained after gelatinization are cooled to the above-described temperature by known means such as water-cooling or air-cooling. The food product temperature of the composition to be attached is preferably from 15 to 60° C., more preferably from 20 to 45° C.

Subsequently, frozen noodles can be obtained by freezing the cooked noodles to which the composition has attached. Means for freezing the noodles may be either quick freezing or slow freezing, and quick freezing is preferred from the viewpoint of the quality maintenance of the noodles. The noodles once frozen by quick freezing can be stored under general frozen-storage condition.

Besides, to the frozen noodles obtained as described above, a sauce or the like may further be attached, so as to make the noodle strands easily loosened when the frozen noodles are thawed or be capable of eating the noodle strands as they are after thawed. The frozen noodles having a sauce or the like adhered thereto can be produced, for example, by attaching the composition to cooked noodles, and further attaching a sauce or the like thereto. Specific examples of a method for producing frozen noodles with a sauce include a method in which the composition is attached to cooked noodles, the resultant noodles are frozen once, a sauce or the like is attached to the frozen noodles and the resultant noodles are frozen again; a method in which the composition is first attached to cooked noodles, a sauce or the like is subsequently attached thereto and the resultant noodles are frozen to obtain frozen noodles; and the like. Examples of means for attaching a sauce or the like to noodles include: immersing noodle strands or a noodle mass in a sauce or the like; coating noodle strands or a noodle mass with a sauce or the like; smearing or spraying a sauce or the like onto noodle strands or a noodle mass; packing noodle strands or a noodle mass together with a sauce or the like; mixing and stirring noodle strands or a noodle mass with a sauce or the like; and sauteing noodle strands or a noodle mass with a sauce or the like.

As the sauce or the like, any of arbitrary sauces and the like may be used in accordance with the type of cooked noodles and preference of consumers. Examples of the sauce or the like include, but are not limited to, tomato-based sauces such as a meat sauce, a Neapolitan sauce and an arrabbiata sauce, a white sauce such as a carbonara sauce, oil sauces such as a peperoncino sauce, a brown sauce and the like for pastas such as macaroni and spaghetti; a noodle soup, a curry sauce and the like for Japanese thick noodles (udon), medium thick noodles (hiyamugi), thin noodles (somen), Japanese buckwheat noodles (soba) and the like; and a Chinese soup, a Worcester sauce and the like for Chinese noodles rice noodles or the like. Besides, the sauce or the like may appropriately include ingredients such as vegetables, mushrooms, meats, seafood, eggs and spices.

In order to prevent drying of the frozen noodles, or in order to ease the thawing process by microwave oven heating or the like, the cooked noodles to which the composition has attached may be frozen in a state where they are packed in a container, or may be packed in a container after being frozen.

The type of container is not especially limited, and examples include a container in any of arbitrary shapes such as a bag, a cup and a tray, and a container obtained by combining these shapes. The container may be further provided with a press lid, a slip lid or a pillared lid. The material of the container may be any material generally used for a food container, and examples include polyethylene terephthalate, crystallized polyethylene terephthalate, polypropylene, polyethylene, polystyrene, and a composite material of any of these. Among these materials, one applicable to microwave oven heating is preferred. The container is preferably provided with a breathable portion from the viewpoint of deaeration and burst prevention. The breathable portion is more preferably provided on a top surface of the container because the deaeration can be thus eased. Examples of the shape of the breathable portion include a circle, an ellipse, a triangle, a rectangle, a polygon and a slit, but the shape is not especially limited as long as deaeration can be properly performed.

The frozen noodles obtained by the aforementioned method are thawed, as occasion demands, to be edible. Thawing means may be thawing at room temperature or slow thawing, but quick thawing with heating means such as a microwave oven, boiling, steam heating, an oven or cooking in a frying pan is preferred.

The frozen noodles obtained by the above-described method maintain a good appearance even after long-term frozen storage although they are noodles obtained by cooking and freezing fresh noodles produced by the rolling noodle-manufacturing method. Besides, the frozen noodles have, even after being thawed and heated again, a good appearance and a resilient (koshi) and elastic texture as those attained immediately after boiling fresh noodles obtained by the extruding noodle-manufacturing method. Furthermore, the frozen noodles can exhibit the good appearance and texture even if they are frozen stored with a sauce added thereto because the noodles are difficult to absorb the sauce.

Therefore, according to the present invention, the appearance or the texture of frozen cooked noodles obtained by cooking and freezing fresh noodles produced by the rolling noodle-manufacturing method can be improved. More specifically, frozen cooked noodles obtained by cooking and freezing fresh noodles produced by the rolling noodle-manufacturing method can be provided with a smooth appearance and a resilient (koshi) and elastic texture as those obtained immediately after cooking fresh noodles produced by the extruding noodle-manufacturing method.

EXAMPLES

Reference Example

Seven compositions (compositions 1 to 7) respectively having different viscosities were prepared by mixing a polysaccharide thickener with water. The constituents and the viscosities of the respective compositions are shown in Table 1.

TABLE 1

| Composition | 1 | 2 | 3 | 4 | 5 | 6 | 7 |
|---|---|---|---|---|---|---|---|
| Constituents (mass %) | | | | | | | |
| Soybean oil | 21.9 | 23.1 | 33.2 | 33.2 | 33.7 | 33.1 | 32.9 |
| Polysaccharide thickener (tamarind gum) | 0.001 | 0.001 | 0.083 | 0.166 | 0.083 | 0.083 | 0.083 |
| Polysaccharide thickener (xanthan gum) | 0.050 | 0.166 | 0.166 | 0.332 | 0.420 | 0.916 | 1.050 |
| Water | balance (about 78) | balance (about 76) | balance (about 66) | balance (about 66) | balance (about 66) | balance (about 66) | balance (about 67) |
| Total | 100 | 100 | 100 | 100 | 100 | 100 | 100 |
| Viscosity of composition (mPa · s at 60° C.) | (Below measurement limit) | 30 | 80 | 230 | 1000 | 2000 | 2400 |

Example 1 Production of Frozen Noodles

Four hundred (400) g of durum flour and 140 g of saline were put in a mixer for noodles and thoroughly kneaded to produce noodle dough. The noodle dough was prepared into noodle sheets by a usual method using a mill roll. The obtained noodle sheets were cut out by using a cutting blade (#12 round) to obtain a fresh spaghetti. Subsequently, the thus obtained fresh spaghetti was boiled for 4 minutes so as to attain a yield within a range of from 220 to 235%, and was then cooled to a food product temperature of 15° C. or less by exposure to cold water. To 360 g of the thus obtained cooked spaghetti, 30 g (8.3% based on the mass of the noodles) of each of the compositions 1 to 7 obtained in Reference Example, which had been adjusted in temperature to 20° C., was sprayed by using a spraying nozzle (manufactured by Spraying Systems Co.), so as to attach the composition to the surface of noodle strands. In spraying, substantially no drip occurred, and substantially the whole amount of composition was attached to the surface of the noodle strands. The resultant spaghetti to which the composition had been sprayed was dividedly packed in a tray (with a length of 20 cm×a width of 15 cm×a height of 3 cm) in an amount of 180 g each, and in each of half of the trays, 100 g of a commercially available canned meat sauce (manufactured by Nisshin Foods Inc.) was further poured on top of the noodle mass. The resultant was quickly frozen at −35° C. to produce frozen spaghetti of Production Examples 1 to 7 (respectively having or not having a sauce).

Test Example 1

Each of the frozen cooked spaghetti of Production Examples 1 to 7 was taken out of the tray and put in a polypropylene bag, and the resultant was stored at −18° C. After 1 week, each frozen spaghetti was taken out of the bag and thawed by microwave oven heating (600 W). The heating time was 3 minutes for one having no sauce, and 4 minutes and 30 seconds for one having the sauce. The appearance and the texture of the thawed spaghetti were evaluated. The spaghetti having the sauce was lightly mixed after the heating so as to evaluate the appearance and the texture of the spaghetti and the sauce. The evaluation was made in accordance with evaluation criteria of Table 2 by 10 panels to obtain an average score. The results are shown in Table 3.

Test Example 2

In the same manner as in Example 1, the composition 4 prepared in Reference Example was attached, in each amount shown in Table 4, to 360 g of cooked spaghetti to produce frozen spaghetti (respectively having or not having a sauce) (Production Examples 8 to 14). The thus obtained frozen spaghetti was evaluated for the appearance and the texture in the same manner as in Test Example 1. The results are shown in Table 4.

TABLE 2

| | | |
|---|---|---|
| Appearance of spaghetti | 5 | The surface of the noodles is extremely smooth. |
| | 4 | The surface of the noodles is considerably smooth. |
| | 3 | The surface of the noodles is comparatively smooth and no roughness is felt. |
| | 2 | The surface of the noodles is rather rough, or the surface is rather dissolved. |
| | 1 | The surface of the noodles is rough, or the surface is dissolved. |
| Texture of spaghetti | 5 | The noodles are sufficiently resilient (koshi) and elastic and have a texture equivalent to that of boiled spaghetti produced by extrusion. |
| | 4 | The noodles are resilient (koshi) and elastic and have a texture similar to that of boiled spaghetti produced by the extrusion. |
| | 3 | The noodles are resilient (koshi) and elastic to some extent and have a texture rather similar to that of boiled spaghetti produced by the extrusion. |
| | 2 | The noodles are rather insufficiently resilient (koshi) or are rather too hard, and poorly have a texture as that of boiled spaghetti produced by the extrusion. |
| | 1 | The noodles are not resilient (koshi) or are too hard and do not have a texture as that of boiled spaghetti produced by the extrusion. |
| Appearance of spaghetti and sauce | 5 | The sauce evenly clings to the noodles to have quite a good appearance. |
| | 4 | The sauce clings to the noodles well. |
| | 3 | The sauce ordinarily clings to the noodles. |
| | 2 | The sauce poorly or unevenly clings to the noodles. |
| | 1 | The sauce considerably poorly and unevenly clings to the noodles. |
| Texture of spaghetti and sauce | 5 | The noodles are sufficiently resilient (koshi) and elastic, and exhibit an extremely good texture together with the sauce. |
| | 4 | The noodles are resilient (koshi) and elastic, and exhibit a good texture together with the sauce. |
| | 3 | The noodles are comparatively resilient (koshi) and elastic, and exhibit an ordinary texture. |
| | 2 | The noodles are rather insufficiently resilient (koshi) or too hard, have absorbed a slight amount of sauce, and exhibit a rather poor texture. |
| | 1 | The noodles are not resilient (koshi) or too hard, have absorbed a large amount of sauce, and exhibit a poor texture. |

TABLE 3

| | Production Example 1 | Production Example 2 | Production Example 3 | Production Example 4 | Production Example 5 | Production Example 6 | Production Example 7 |
|---|---|---|---|---|---|---|---|
| Constituents of composition (mass %) | | | | | | | |
| Soybean oil | 21.9 | 23.1 | 33.2 | 33.2 | 33.7 | 33.1 | 32.9 |
| Polysaccharide thickener (tamarind gum) | 0.001 | 0.001 | 0.083 | 0.166 | 0.083 | 0.083 | 0.083 |
| Polysaccharide thickener (xanthan gum) | 0.050 | 0.166 | 0.166 | 0.332 | 0.420 | 0.916 | 1.050 |
| Water | balance (about 78) | balance (about 76) | balance (about 66) | balance (about 66) | balance (about 66) | balance (about 66) | balance (about 67) |
| Total | 100 | 100 | 100 | 100 | 100 | 100 | 100 |
| Viscosity of composition (mPa·s at 60° C.) | (Below measurement limit) | 30 | 80 | 230 | 1000 | 2000 | 2400 |
| Amount of composition attached (% based on mass of noodles) | 8.3 | 8.3 | 8.3 | 8.3 | 8.3 | 8.3 | 8.3 |
| Appearance of spaghetti | 1.5 | 3.5 | 4.2 | 4.8 | 4.3 | 3.7 | 2.3 |
| Texture of spaghetti | 2.0 | 3.8 | 4.1 | 4.7 | 4.1 | 3.8 | 2.0 |
| Appearance of spaghetti and sauce | 2.0 | 3.6 | 4.4 | 4.8 | 4.3 | 3.6 | 3.5 |
| Texture of spaghetti and sauce | 1.6 | 4.0 | 4.1 | 4.6 | 4.0 | 3.9 | 3.6 |

TABLE 4

| | Production Example 8 | Production Example 9 | Production Example 10 | Production Example 11 | Production Example 12 | Production Example 13 | Production Example 14 |
|---|---|---|---|---|---|---|---|
| Amount of composition attached (% based on mass of noodles) | 0.5 | 1.0 | 2.0 | 5.0 | 10 | 15 | 20 |
| Appearance of spaghetti | 2.2 | 4.0 | 4.1 | 4.2 | 4.4 | 3.9 | 2.0 |
| Texture of spaghetti | 2.1 | 3.8 | 3.8 | 4.5 | 4.8 | 4.0 | 1.5 |
| Appearance of spaghetti and sauce | 1.9 | 3.9 | 3.9 | 4.1 | 4.0 | 3.8 | 2.3 |
| Texture of spaghetti and sauce | 1.9 | 3.9 | 4.0 | 4.2 | 4.4 | 4.2 | 1.8 |

Test Example 3

Compositions were prepared in the same manner as in Reference Example except that a polysaccharide thickener shown in Table 5 was used. By using each of these compositions, frozen spaghetti (respectively having or not having a sauce) was produced in the same manner as in Example 1 (Production Examples 15 to 18). The thus obtained frozen spaghetti was evaluated for the appearance and the texture in the same manner as in Test Example 1. The constituents and the viscosities of the prepared compositions, the amounts of the compositions attached to the noodles, and the evaluation results of the appearance and the texture are shown in Table 5.

TABLE 5

| | Production Example 15 | Production Example 16 | Production Example 17 | Production Example 18 |
|---|---|---|---|---|
| Constituents of composition (mass %) | | | | |
| Soybean oil | 33.6 | 33.6 | 33.6 | 33.6 |
| Polysaccharide thickener (Xanthan gum) | 0.4 | — | — | — |
| Polysaccharide thickener (Tamarind gum) | — | 0.4 | — | — |
| Polysaccharide thickener (guar gam) | — | — | 0.4 | — |
| Polysaccharide thickener (carrageenan) | — | — | — | 0.4 |
| Water | 66 | 66 | 66 | 66 |
| Total | 100 | 100 | 100 | 100 |
| Viscosity of composition (mPa · s at 60° C.) | 230 | 220 | 200 | 250 |
| Amount of composition attached (% based on mass of noodles) | 8.3 | 8.3 | 8.3 | 8.3 |
| Appearance of spaghetti | 4.8 | 3.3 | 3.2 | 3.0 |
| Texture of spaghetti | 4.7 | 2.8 | 2.1 | 1.9 |
| Appearance of spaghetti and sauce | 4.8 | 3.2 | 3.0 | 3.1 |
| Texture of spaghetti and sauce | 4.6 | 3.3 | 2.4 | 2.0 |

The invention claimed is:

1. A method for producing frozen noodles, the method comprising:
    attaching a composition comprising xanthan gum and having a viscosity of from 30 to 2000 mPa·s at 60° C. to cooked noodles obtained by cooking fresh noodles produced by a rolling noodle-manufacturing method; and
    freezing the noodles to which the composition has attached,
    wherein the composition at a composition temperature ranging from 20 to 60° C. is attached to the cooked noodles having a food product temperature of 15° C. or less.

2. The method according to claim 1, wherein the composition is attached to the cooked noodles in an amount of from 1 to 15% by mass based on a mass of the cooked noodles.

3. The method according to claim 1, wherein a content of the xanthan gum in the composition is from 0.1 to 1.0% by mass.

4. The method according to claim 1, wherein the composition further comprises water and oil or fat.

5. The method according to claim 4, wherein a content of the water in the composition is from 60 to 80% by mass, and a content of the oil or fat in the composition is from 27 to 38% by mass.

6. The method according to claim 1, wherein the composition further comprises a polysaccharide other than the xanthan gum.

7. The method according to claim 6, wherein a content of the polysaccharide in the composition is from 0.1 to 1.0% by mass.

8. The method according to claim 1, wherein the composition comprises no common salt.

9. The method according to claim 1, wherein the composition at from 20 to 45° C. is attached to the cooked noodles having a food product temperature of 15° C. or less.

10. A method for improving an appearance or a texture of frozen cooked noodles obtained by cooking and freezing fresh noodles produced by a rolling noodle-manufacturing, the method comprising:
    attaching a composition comprising xanthan gum and having a viscosity of 30 to 2000 mPa·s at 60° C. to cooked noodles obtained by cooking a fresh noodles produced by a rolling noodle-manufacturing method; and
    freezing the noodles to which the composition has attached,
    wherein the composition at a composition temperature ranging from 20 to 60° C. is attached to the cooked noodles having a food product temperature of 15° C. or less.

11. The method according to claim 10, wherein the composition is attached to the cooked noodles in an amount of from 1 to 15% by mass based on a mass of the cooked noodles.

12. The method according to claim 10, wherein a content of the xanthan gum in the composition is from 0.1 to 1.0% by mass.

13. The method according to claim 10, wherein the composition further comprises water and oil or fat.

14. The method according to claim 13, wherein a content of the water in the composition is from 60 to 80% by mass, and a content of the oil or fat in the composition is from 27 to 38% by mass.

15. The method according to claim 10, wherein the composition further comprises a polysaccharide other than the xanthan gum.

16. The method according to claim 15, wherein a content of the polysaccharide in the composition is from 0.1 to 1.0% by mass.

17. The method according to claim 10, wherein the composition comprises no common salt.

18. The method according to claim 10, wherein the composition at from 20 to 45 20° C. is attached to the cooked noodles having a food product temperature of 15° C. or less.

* * * * *

UNITED STATES PATENT AND TRADEMARK OFFICE
CERTIFICATE OF CORRECTION

PATENT NO. : 10,219,533 B2
APPLICATION NO. : 14/389943
DATED : March 5, 2019
INVENTOR(S) : Irie et al.

It is certified that error appears in the above-identified patent and that said Letters Patent is hereby corrected as shown below:

In the Claims

Column 13, Line 7, "composition at from 20 to 4520 C. is attached to the cooked," should read
-- composition at from 20 to 45° C. is attached to the cooked --

Signed and Sealed this
Fourteenth Day of April, 2020

Andrei Iancu
*Director of the United States Patent and Trademark Office*